Sept. 27, 1966 G. V. CLEARY, JR 3,275,316
INSERT FOR NEWSPAPERS
Filed April 12, 1965 3 Sheets-Sheet 1
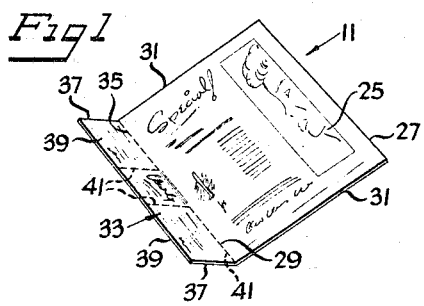
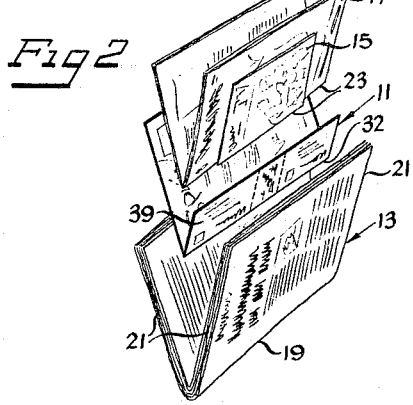
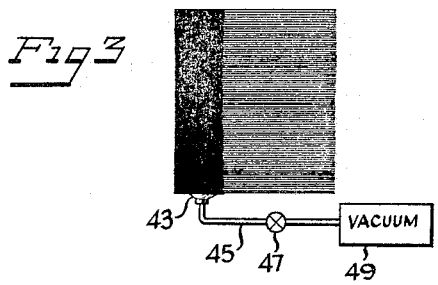
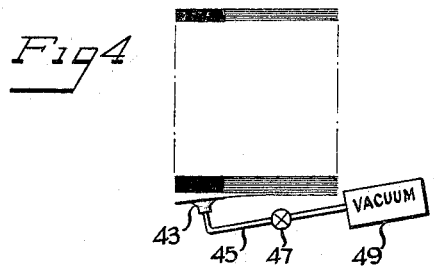
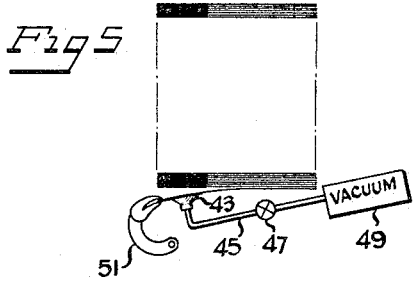
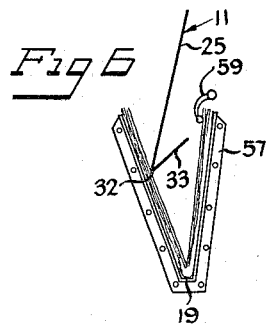
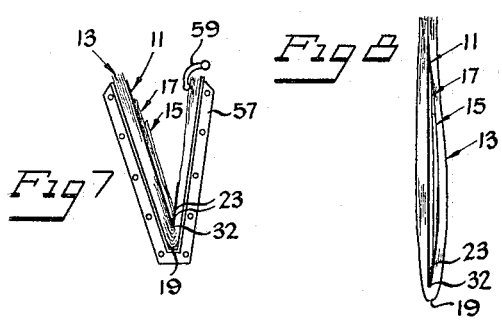
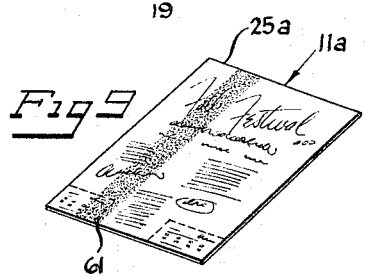
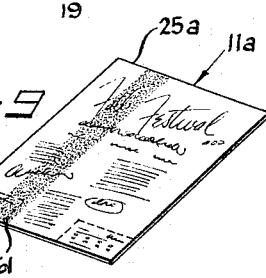
Inventor
Gerald V. Cleary, Jr.
By Anderson, Luedeka, Fitch, Even & Tabin
Atty's Sept. 27, 1966 G. V. CLEARY, JR 3,275,316
INSERT FOR NEWSPAPERS
Filed April 12, 1965 3 Sheets-Sheet 2
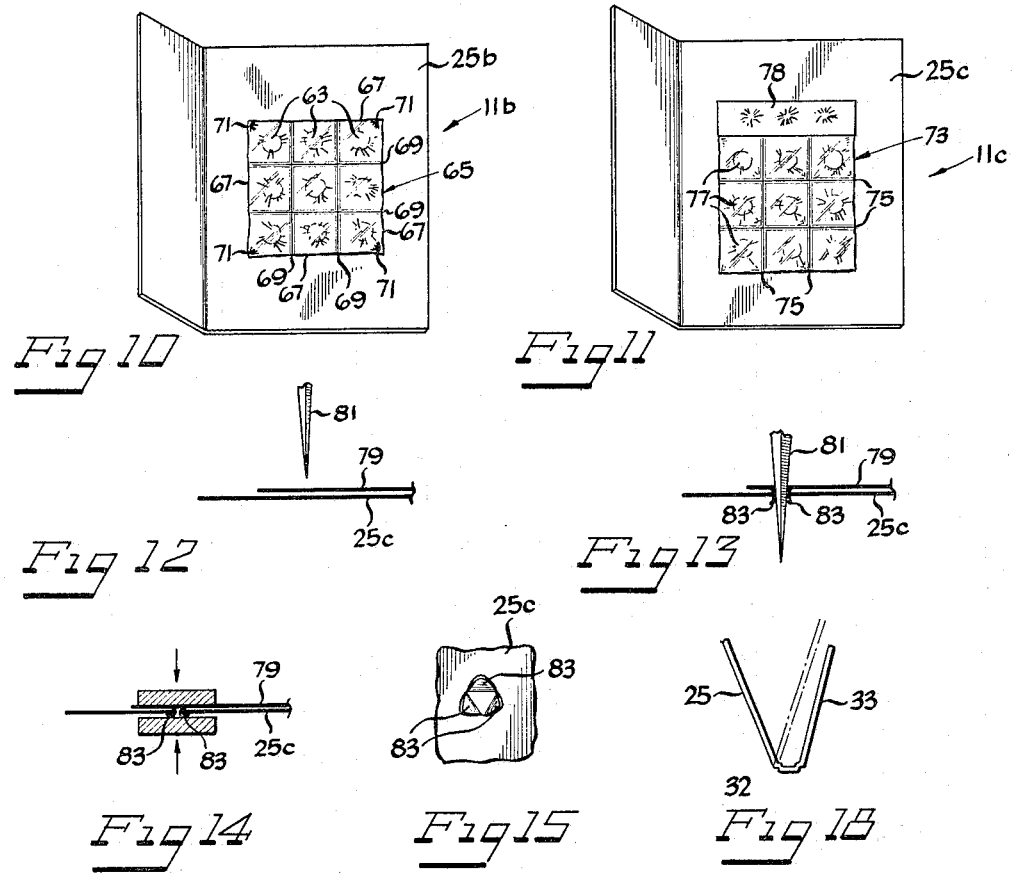
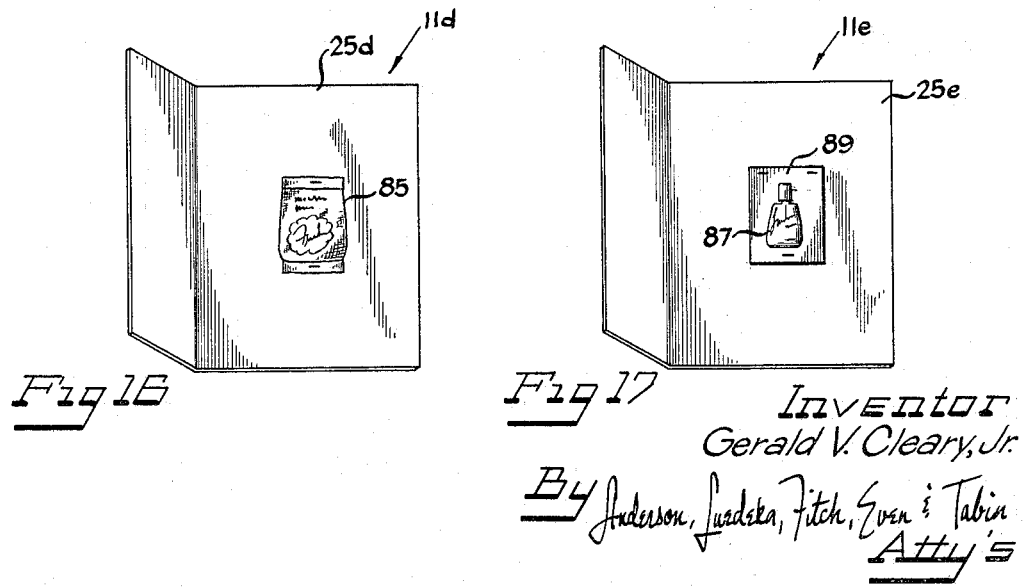
Inventor
Gerald V. Cleary, Jr.

Sept. 27, 1966 G. V. CLEARY, JR 3,275,316
INSERT FOR NEWSPAPERS
Filed April 12, 1965 3 Sheets-Sheet 3

Inventor
Gerald V. Cleary, Jr.
By Anderson, Luedeka, Fitch, Even & Tabin
Atty's

United States Patent Office 3,275,316
Patented Sept. 27, 1966

3,275,316
INSERT FOR NEWSPAPERS
Gerald V. Cleary, Jr., 463 Park Ave., Glencoe, Ill.
Filed Apr. 12, 1965, Ser. No. 449,684
14 Claims. (Cl. 270—57)

This application is a continuation-in-part of copending application Serial No. 393,591, filed September 1, 1964, now abandoned.

The present invention relates generally to carriers for printed material and, more particularly, to an advertising insert which is particularly adapted to be included in an assemblage of newspaper sections.

In the promotion of goods and services through advertising, it is frequently desirable to include with the advertising material a coupon or the like which will cause a consumer to initiate a more direct contact with the advertiser or his product. For example, the advertising material may include a coupon which can be completed and mailed to the advertiser to indicate a desire to obtain more information or as a means of obtaining a free sample, thus providing the advertiser with the name and address of an interested potential customer. In addition, coupons may be provided which entitle the consumer to a discount on certain of the advertiser's merchandise if presented at the time of purchase, thereby inducing a consumer to try the advertised product. Still other coupons are provided which entitle the consumer to a bonus, as in the form of premium stamps, cash, or products, if presented at the establishment of the advertiser at the time of purchase, thus causing the consumer to patronize the business of the advertiser.

Coupons of the type referred to above are frequently included in an advertisement contained in the body of a newspaper or magazine, in which case they are printed on ordinary newsprint or magazine stock. Thus, they must be clipped from the page in which they are located and, if appropriate, filled out and mailed in an envelope provided by the consumer and at the consumer's expense. The return rate on such coupons is generally low because of the effort required of the consumer and the inconvenience to which he is put.

The coupons are thus preferably printed on heavier stock of the type utilized in postcards, tickets, and the like. If it is intended that the cards be mailed, they can be provided, or be rendered separable, in postcard size, self-addressed, postage prepaid, thus rendering them returnable to the advertiser, while the initial impact of the advertisement is still operating, and at no cost to the consumer. When received by the advertiser, the coupons are sturdy and of uniform size, thus rendering them easier to process and tabulate.

Heavy stock advertisements are presently distributed principally through the mail, or by stapling or stitching a narrow insert into a magazine. Distribution through the mail is expensive and requires the use of prepared lists which are frequently inaccurate and seldom complete. Distribution by stapling or stitching of the material into a magazine of nationwide circulation is not particularly suitable for regional or local advertising and, in addition, is expensive.

Inclusion of coupon-type advertisements in a newspaper would obviate essentially all of the difficulties enumerated above with respect to direct mailing and magazines. Newspaper advertising is relatively inexpensive, does not require consumer lists, places the advertisements in the hands of a large segment of the market, and can be confined to a local area as small as a single city or even a portion thereof. Prior to the present invention, however, no practical method had been devised for including in a newspaper an advertisement printed on heavy stock. Newspapers generally do not use stapling or stitching or, if they do, do not have either the time or the equipment necessary for attaching inserts in this manner. Hence, the procedures used by magazines are unavailable. Furthermore, a magazine-type insert can not be adequately retained in place without stapling. Also, the stuffing of newspapers is conventionally accomplished on a machine known as a Sheridan Stuffing Machine, which will not readily accept a single sheet insert of the magazine type.

Another form of advertising which has long had wide acceptance but which has heretofore proved impractical is the furnishing of product samples to customers. This form of advertising is preferred over other forms since there is a much greater possibility that the potential customer will actually try the product. Prior to the present invention, such samples were distributed by door-to-door delivery or by mail, both of which methods were quite costly.

The principal object of the present invention is to provide an improved advertising insert of heavy stock particularly adapted for use within an assemblage of newspaper sections.

Another object of the invention is to provide an improved method for including an item of advertising material of heavy stock in an assemblage of newspaper sections.

A further object of the invention is to provide a newspaper assemblage which includes an improved item of advertising material of heavy stock.

A still further object of the invention is to provide an improved method and means for providing potential customers with a product sample.

Other objects and advantages of the invention will become apparent with reference to the following description and the accompanying drawings.

In the drawings:

FIGURE 1 is a perspective view of an advertising insert showing various of the features of the invention;

FIGURE 2 is an exploded view of the insert of FIGURE 1 arranged with a plurality of newspaper sections;

FIGURES 3 through 7 are diagrammatic views showing certain steps in a method of placing the insert of FIGURE 1 in an assemblage of newspaper sections;

FIGURE 8 is an enlarged end view of an assemblage of newspaper sections including the insert of FIGURE 1;

FIGURE 9 is a perspective view of another form of insert showing various of the features of the invention;

FIGURES 10 and 11 are perspective views of alternate embodiments of the invention, in which product samples are carried by the insert;

FIGURES 12–15 are views illustrating a method of securing a sample package to the insert;

FIGURES 16 and 17 are perspective views of additional alternate embodiments of the invention in which product samples are carried by the insert;

FIGURE 18 is a fragmentary end view of an insert illustrating a particular form of fold;

Figure 19:
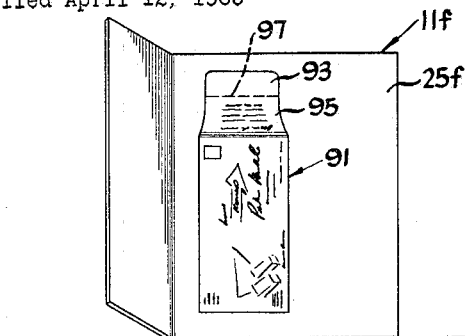
FIGURES 19 and 20 are perspective views of alternate embodiments of the invention in which envelopes are provided with the insert.

Very generally, the present invention is directed to an advertising insert 11 which is adapted to be included in an assemblage of newspapers sections including an outer section 13 and one or more inner sections such as those designated by the numerals 15 and 17 and shown in FIGURES 2 and 8. When so assembled, the outer section 13 encloses the insert 11 and also encloses the inner sections 15 and 17 which, in the embodiment of FIGURES 1 through 8, are disposed within the insert and help to retain it in place.

The outer section 13 may take any one of several forms but, in the illustrated embodiment, is of the type most commonly used as, for example, by the Chicago Tribune, the Los Angeles Times and The Cleveland Plain Dealer. Basically, it is composed of large rectangular sheets approximately 30 x 23½ inches in size which are superimposed upon one another and folded along a first axis, hereinafter referred to as a minor fold line, to provide separate pages approximately 15 x 23½ inches. The sheets are then folded along an axis transverse to the minor fold line, such axis being hereinafter referred to as the major fold line and designated by the numeral 19, to provide a folded section measuring approximately 15 x 11½ inches. When the section is folded in this manner, the minor fold lines form one of the lateral edges 21 of the section. None of the sheets of the outer section are stapled or stitched.

Newspaper sections known as tabloids (not shown) are also utilized and are approximately one-half the size of the sections referred to above, i.e., are formed of sheets approximately 15 x 23½ inches which are then folded once along a major fold line to provide a section 15 x 11½ inches. The insert 11 of the present invention may also be utilized with sections of such size.

The inner sections 15 and 17 may be identical in size and arrangement to the outer section 13 or may, as in the illustrated embodiment, be smaller in size, formed of superimposed sheets folded a single time along a major fold line 23, which sheets may or may not be stapled or sewn together. In the latter case, the sections are frequently referred to as "supplements." In either case, the inner and outer sections are interleaved, with the inner sections being enclosed by the outer sections and, perhaps, by other inner sections. When the inner and outer sections are so arranged, the major fold lines of all of the sections are generally collinear.

The insert 11 is adapted to be disposed intermediate an inner and outer section, or between a pair of inner sections, as desired. However, in the following discussion, the term outer section will be taken to mean any section which encloses at least one inner section.

Referring now to FIGURE 1, the insert 11 is preferably formed of heavy paper stock, e.g., a stock having a basic weight of from seventy to eighty pounds per ream of sheets measuring 25 x 38 inches, and comprises a generally rectangular panel 25 having generally parallel top and bottom edges 27 and 29, respectively, and having generally parallel lateral edges 31. The panel 25 is preferably dimensioned so not to be larger in any respect than the folded outer section 13 so that when enclosed therein it will not project past the edges thereof. Accordingly, the edges 27 and 29 are preferably of a length less than that of the major fold line 19 of the outer section 13, e.g., thirteen inches, and the edges 31 are preferably of a length less than that of the lateral edges 21 of the section 13, i.e., ten and one-half inches. Advertising messages are printed on one or both faces of the panel 25, with opposite sides being utilized by the same or different advertisers as desired. Coupons or return cards (not shown) may be detachable from the panel along perforated lines as indicated by the circumstances.

Foldably attached to the bottom edge 29 of the panel 25 in the embodiment of FIGURES 1 through 8, along a fold line 32, is a generally rectangular flap 33 which includes a bottom edge 35 which is preferably coextensive with the bottom edge 29 of the panel. The flap is of a much lesser width than the panel 25, however, and includes lateral edges 37 which are approximately 3¼ inches in length. The flap 33 is preferably provided with coupons or return cards 39 detachably secured by perforated lines 41. If the return cards are printed as postcards, the normal width of which is 3¼ inches, one of the lines of perforation may be along the fold line 32. Such cards are readily mailable because of the heavy stock of which the insert is formed and are preferably self-addressed, postage paid.

The insert 11 is interleaved with the outer section 13 and the inner sections 15 and 17 to form a final assemblage such as is shown in FIGURES 2 and 8. More specifically, the insert 11 is placed within the folds of the outer section 13 with its bottom edge, as defined by the fold line 32, positioned so as to be generally collinear with the major fold line 19 of the outer section. The inner sections 15 and 17 are placed at least partially intermediate the panel 25 and flap 33 of the insert 11, with the bottom edges 23 of the inner sections preferably but not necessarily positioned so as to be generally collinear with the bottom edge or fold line 32 of the insert 11.

Thus, when the insert and sections are assembled, the pocket formed by the panel and flap of the insert receives the inner sections, the weight of which serves to retain the insert in place within the outer section. Also, the fact that the flap is preferably considerably narrower than the inner sections permits contact between the surfaces of the inner and outer sections and again serves to retain the insert in place because of the tendency of such sections to adhere to one another.

A method of arranging the above-described assemblage by means of a Sheridan Stuffing Machine or stuffer is shown diagrammatically in FIGURES 3 through 7. FIGURE 3 shows a stack of such inserts positioned in a hopper of the stuffer with the flap 33 of the inserts disposed adjacent the left or leading edge, and beneath, the panel 25. The tack is preferably supported from beneath by fingers (not shown) which engage the periphery of the lowermost insert, thereby exposing a substantial portion of the lower surface of the flap of the lowermost insert. The trailing edge of the stack may be supported by a plate or rod if desired.

Positioned beneath the hopper is a pair of flexible resilient cups or "suckers" 43 which are mounted on tubular arms 45 connected through a valve 47 to a vacuum source 49. When the valve 47 is opened, the flap of the lowermost insert is caused to adhere to the suckers 43. The arms 45 are then moved downwardly, pulling the lowermost insert downwardly as well so as to disengage it from the fingers of the hopper and offset it from the stack. The offset lowermost insert is subsequently engaged by a grabber 51, referred to in greater detail shortly, which completely withdraws it from the stack.

It should be understood that the vacuum actuated sucker 43 is standard equipment on a Sheridan Stuffing Machine and normally engages a newspaper section in the same manner as the engagement of the insert as described above. The suction exerted by these suckers is sufficiently great, therefore, to enable them to securely grip a heavy newspaper section and withdraw it from a stack despite the weight of the stack. This suction, however, is also such that if single thickness inserts of medium stock are utilized, more than one insert will be engaged and withdrawn, causing the grabber 51 to jam. In the preferred embodiment, however, the use of the heavy paper stock e.g., stock having a basis weight of seventy to eighty pounds, as previously defined, and the provision of the flap 33, which provides a double thickness of such stock and a resulting air pocket, prevent the suckers from affecting the insert immediately above the lowermost insert. Hence, the flap 33, in addition to facilitating the retention of the insert in the assemblage of sections, also renders the insert suitable for use in a Sheridan Stuffing Machine, without which the insertion would have to be made manually and at great inconvenience.

The grabbers 51 are pivotally mounted on a rotating drum (not shown) which causes them to travel from right to left, as viewed in the drawing, and to move up into position to engage and withdraw the lowermost insert of the stack. The grabbers deposit the insert in a V-shaped carrier 57 in which an outer section 13 is maintained in partially open position by a clamp 59. The inner sections are deposited from subsequent hoppers and nest within the partially open insert (FIG. 7).

It is to be noted that the insert 11 and, hence, the inner sections 15 and 17, engage the forwardmost or left wall of the carrier as they enter (FIG. 6). Also, when the insert 11 is disposed within the carrier (FIG. 7), the panel 25 is disposed adjacent this left wall. Hence, the inner sections, when entering a carrier occupied by an insert 11, will first engage the panel 25 and will slide down that panel toward the fold line 32 of the insert. Thus, if the insert is not fully open after it is deposited in the carrier, the subsequent insertion of an inner section will cause it to be opened.

The insert 11, formed of heavy stock, provides a printing surface which is greatly superior to that of conventional newsprint. Accordingly, the insert 11, in addition to providing the advantages previously enumerated, also renders the advertising material provided thereon much more attractive in comparison, thus enhancing the consumer appeal of the advertisement.

FIGURE 9 shows another form of insert 11a which is similar to the insert 11 previously described in that it includes a panel 25a of the size of the panel 25, previously referred to. However, the insert 11a does not include the flap 33. To render the insert 11a suitable for use with the Sheridan Stuffing Machine, one of its longer edges is provided with a coating 61 of a material which renders it essentially gas impervious. The insert is positioned in the hopper of the stuffer so that the coated edge will be engaged by the suckers 43. Because of the gas impervious nature of the coating 61, the suction of the suckers does not affect the inserts disposed immediately above the lowermost insert of the hopper, as is desired.

FIGURES 10–17 illustrate an application for the above-described insert in which it not only presents an advertising message but serves in addition as a vehicle for distributing a sample of a consumer product or commercial commodity to a potential customer. This use of the insert makes it possible to place a sample in the hands of nearly everyone in a market area at a much lower cost than could be accomplished by mailing. Also, it makes it possible for an advertising message to effectively accompany the sample.

In the embodiment shown in FIGURE 10, a number of samples 63 are contained in a package 65 comprising a pair of flexible sheets, which may be transparent or otherwise, bonded or otherwise secured along their edges 67 and also along lines 69 extending between each pair of opposing side edges. The lines 69 divide the package into nine areas, each of which may contain a sample such as, for example, a given quantity of granular material, such as might be utilized in the preparation of a beverage. Other forms of samples packaged in this form might include medicinal tablets, pieces of candy, or even viscous liquids such as catsup and other condiments. Preferably, the lines 69 are partially perforated to facilitate individual use of the sample located in each area.

The package 65 may be secured to the panel 25b in a number of ways. In the embodiment shown in FIGURE 10, for example, the package is fastened to the panel at one or more of the points 71 with glue, or by providing one of its surfaces with a coating of a thermoplastic material and bonding it with a heated instrument. Preferably, the insert is formed of paper of heavier stock when a sample of significant weight is attached to it to render it more adapted to support the sample.

FIGURE 11 illustrates a package 73 similar to the package 65 in that it is formed of a pair of flexible sheets secured together at their edges and along lines 75 to support a number of samples 77. The package 73 is provided at its upper end, however, with a large edge portion 78 preferably reinforced by heavy paper, providing convenient means of attachment of the package to the panel 25c. One suggested method of attachment is shown most clearly in FIGS. 12–15. In accordance with this method, the edge portion 78 and the panel 25c are pierced by a tool 81 of triangular cross-sectional configuration which tapers to a sharp point. When the edge portion 79 and panel are pierced, flaps 83 are formed in each and are forced through the opening formed by the tool beneath the surface of the panel. The panel and edge portion of the package are then placed under pressure, creasing the flaps in their displaced position and securing the package 73 to the insert.

FIGURE 16 illustrates another method of attaching a sample to an insert 11d in which the sample (not shown) is contained in an envelope 85 which is then secured by staples to the panel 25d of the insert. In FIGURE 17, the sample is in the form of a tube 87 of a liquid such as toothpaste, shaving cream, shampoo or hair cream which is secured in any known manner to a card 89 of stiff material such as cardboard. The card 89 is then stapled to the panel 25e of an insert 11e.

FIGURE 18 illustrates a form of fold line 32 for the insert believed to particularly suitable. In accordance with this form, the fold line creates a tendency for panel 25 and flap 33 to be biased toward an open position, such as is seen in FIGURE 6. Thus, in the placing of the inserts among newspaper sections, there will be greater assurance that at least one section following the insert will be disposed between the panel and flap to retain the insert in place. This may be accomplished by embossing the insert on its outer surface. In the embodiment shown in FIGURE 18, two such lines are provided in parallel relatively closely spaced relation to each other. In addition to providing the improved biasing effect, the lines enable the insert to assume the condition shown in phantom in FIGURE 18 in which the portion intermediate the parallel fold lines juts from the lower edge of the panel and provides a ledge on which succeeding newspaper sections not located between the panel and flap may rest, thereby further serving to retain the insert in place.

Frequently it is desirable to provide the consumer with an envelope rather than merely a return card. Such a situation arises, for example, where it is necessary for the consumer to forward a sum of money to the advertiser or where, as in certain types of businesses dealing principally in services, the consumer is asked to forward goods, such as photographic film to be developed by the advertiser.

Figure 20:
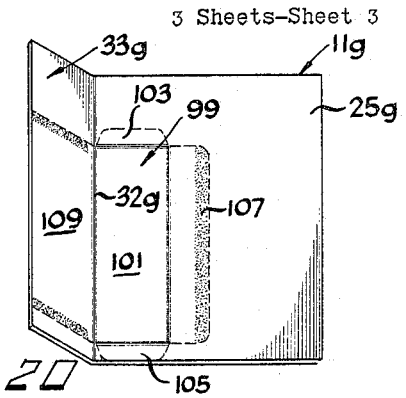
Figure 21:
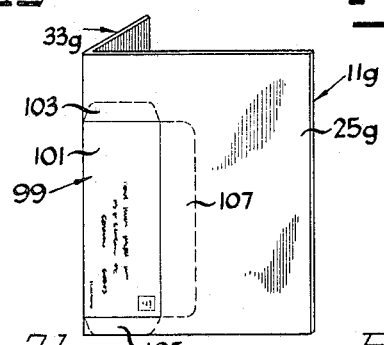
FIGURE 21 is a perspective view of the reverse side of the insert of FIGURE 20.

Accordingly, FIGURES 19–21 illustrate an embodiment of the invention in which the commercial commodity is an envelope provided by the insert. In the embodiment of FIGURE 19, an envelope 91 is provided in ready to use form and may be attached to the panel 25f of an insert 11f in a variety of ways. One suitable way is by means of an adhesive provided on an extension 93 attached to a flap 95 of the envelope 91 along a line of perforations 97. It should be noted that the presence of the envelope 91 within the insert increases the effective weight of the insert and may make it possible to utilize paper of lesser basis weight for the insert itself.

In the embodiment of FIGURES 20 and 21, an insert 11g is provided in which the panel 25g and flap 33g contain the outline, in perforation, of an envelope 99. More specifically, the panel 25g includes the outline of a front face 101 of the envelope, which face is bordered on three sides by end flaps 103 and 105 and by a top flap 107 which is suitably glued. From FIGURE 21 it will be noted that the front face 101 is provided on its outer surface with the advertiser's address and a postage paid indicia. The flap 33g of the insert defines a back face 109, the side edges of which are glued to afford attachment to the flaps 103 and 105. It will be noted that the fold line 32g of the insert serves as the line of separation between the front and back faces 101 and 109, thereby making further folding by the consumer unnecessary. Lines are provided on the panel 25g to aid in the folding of the flaps 103, 105 and 107.

Figure 22:
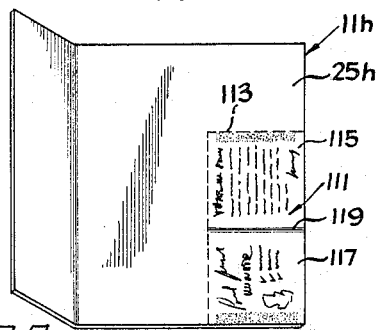
FIGURE 22 is a perspective view of an additional embodiment of the invention in which a form of return card is provided by the insert.
Figure 23:
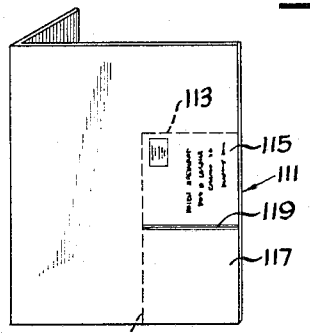
FIGURE 23 is a perspective view of the reverse side of the insert of FIGURE 22.
Figure 24:
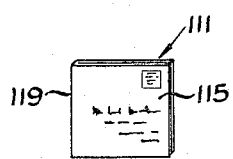
FIGURE 24 is a perspective view of the folded return card provided by the insert of FIGURES 22 and 23.

Referring to the embodiments of FIGURES 22–24, it is to be recognized that certain forms of marketing seek some information from the consumer before further contact is made. For example, in the sale of insurance, the advertiser frequently desires to know in advance the age and general state of health of the prospect so that certain figures can be compiled. Also, in requests for information about loans certain preliminary figures are generally desired by the lending agency. Often this information is regarded as confidential by the consumer who thus hesitates to place it on the reverse side of a post card where it is exposed to view.

In the embodiment of FIGURES 22–24, a return card 111 is provided which is attached to the panel 25h of an insert 11h by perforations 113. The card 111 comprises a pair of panels 115 and 117 attached along what subsequently becomes a fold line 119. As can be seen in FIGURE 22, the inner faces of the panels 115 and 117 include space for the information or data requested by the advertiser addressee. This surface also includes a line of adhesive on each panel, which lines will overlie one another when the card is folded and adhere on contact. The opposite face of the panel 115 (FIG. 23) preferably contains the address of the advertiser and a postage paid indicia. The opposite face of the panel 117 may contain an advertising message if desired. FIGURE 24 shows the return card in its folded condition.

Figure 25:
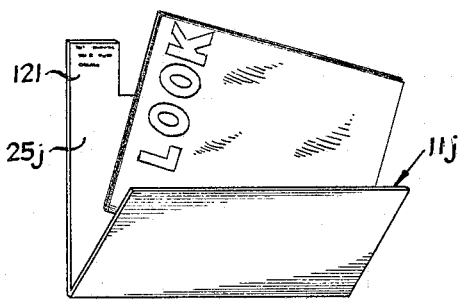
FIGURES 25 and 26 are perspective views of still another embodiment of the invention in which the insert is adapted for the distribution of magazines.
Figure 26:
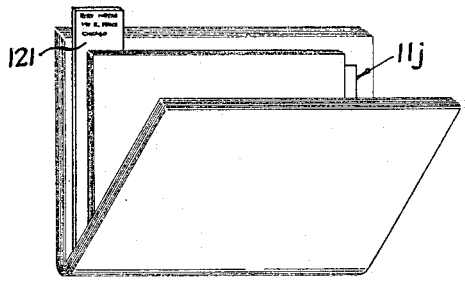

FIGURES 25 and 26 illustrate still another form of insert 11j which is adapted for the distribution of magazines along with newspaper sections and, hence, carries an addressee designation. Accordingly, the insert 11j includes a panel 25j which is provided with a tab 121 which is of sufficient length to enable its outer end to project upwardly past the edges of the newspaper sections and thus be visible to an observer or "readable" by a machine or system. This outer end portion is provided with the addressee's name and address to enable the newspaper carrier to deliver it to the proper location, and is also preferably provided with other indicia which can be sensed by electronic machines to enable it to be directed to the correct area of the city. In this manner, all magazines intended for a particular newspaper route can be directed to a particular newspaper carrier and can be delivered by him along with the newspaper. Thus, the mailing costs of the magazines is avoided with slight increase in cost to the newspaper.

Provision has thus been made whereby a single sheet insert is included in an assemblage of newspaper sections. Accordingly, through employment of the present invention, certain forms of printed materials can be distributed via newspapers in a manner previously not practical. Also, the insert is capable of serving as a vehicle for samples of consumer products, return envelopes, novel forms of postal cards, and magazines, thus providing a convenient, economical and effective means for placing these items in the hands of a potential customer.

While the present invention has been shown and described with respect to certain preferred embodiments thereof, it should be apparent that various modifications may be made with respect to such embodiments without departing from the scope of the invention.

Various of the features of the invention are set forth in the following claims.

What is claimed is:
1. An assemblage of printed material comprising
  A. an inner and an outer newspaper section each of which is folded along a major fold line and each of which includes lateral edges generally normal to said fold line,
    (1) said sections being arranged within one another with at least one inner section being nested within the folds of an outer section and with the major fold lines of each the inner and the outer section being generally collinear,
  B. and a single sheet insert adapted to carry an advertising message,
    (1) said insert including a generally rectangular panel and a flap foldably attached to said panel along one edge thereof, one of said panel and flap having attached thereto a sample of a commercial commodity,
      (a) said insert being disposed intermediate said inner and outer sections with the said one edge generally collinear with a major fold line of said outer section and with its panel and flap disposed on opposite sides of said inner section so as to cause the weight of said inner section to serve to retain said insert within said outer section without the use of fasteners,
      (b) said panel and said flap on said insert each being dimensioned so as not to project outwardly past an edge of said assemblage.

2. An assemblage of printed material in accordance with claim 1 wherein a package is secured to the insert containing a number of compartments each containing a commercial commodity.

3. An assemblage of printed material in accordance with claim 1 wherein said commercial commodity is contained in a package secured to said insert by piercing the package and insert and flaring and creasing the portions of the package and insert displaced thereby.

4. An assemblage of printed material in accordance with claim 1 wherein the commercial commodity is secured to said generally rectangular panel of said insert.

5. An assemblage of printed material in accordance with claim 1 wherein said panel and flap are interconnected along a fold line formed so as to bias the panel and flap toward an unfolded spaced apart position.

6. An assemblage of printed material in accordance with claim 5 wherein said panel and flap are interconnected along a pair of generally parallel relatively closely spaced fold lines formed so as to bias the panel and flap toward an unfolded spaced apart position.

7. A single sheet advertising insert for use with a stuffing machine including a hopper for receiving a stack of the inserts, a means for offsetting the lowermost insert of the stack including a vacuum sucker mounted on an arm, and a set of grabbers for engaging and withdrawing the insert and depositing same in a carrier, said insert comprising
  A. a generally rectangular panel having an advertising message printed thereon and positionable so that one edge thereof is engaged by the suckers of the machine,
    (1) one surface of said panel adjacent said one edge being coated with a material rendering said coated portion essentially gas impervious so as to prevent the sucker from affecting the arrangement of inserts disposed above an insert engaged by the suckers.

8. A method of inserting a pre-addressed postal card and accompanying advertising material embodied in a single sheet into an assemblage of newspaper sections by means of a stuffing machine having a hopper for receiving a stack of sheet material and having means for offsetting the lowermost item of the stack including a vacuum sucker mounted on an arm and a set of grabbers for engaging and withdrawing the item and depositing same in a carrier, said single sheet being of a stock having a weight acceptable for mailing as a postal card but normally not feedable as an item from said hopper when in single thickness form because of the tendency of the suckers to influence the sheet overlying the sheet which is engaged by the suckers, said stock having a weight, however, sufficient to enable it to be fed in folded form, said method including the steps of A. causing the single sheet to be folded so as to define a generally rectangular panel and a generally rectangular flap, said panel and flap being disposed in overlying relation to each other and interconnected along a fold line at adjacent edges thereof,
  (1) said panel including opposed top and bottom edges having a length no greater than the length of the major fold line of at least one of the folded newspaper sections and including side edges having a length no greater than the length of a lateral edge of at least one of said folded newspaper sections,
    (a) at least one surface of said panel having an advertising message printed thereon.
  (2) one of said panel and flap including lines of perforation outlining an area suitably printed so as to enable it to be detached and utilized as a pre-addressed postal card,
B. and placing the folded sheet in the hopper so that both the panel and flap are in alignment with each sucker when the sucker engages the sheet so as to insure a double thickness of material at the point of engagement and thereby prevent the vacuum of the suckers from affecting the arrangement of sheets disposed above the sheet engaged by the suckers.

9. A method of inserting a commercial commodity and accompanying advertising material carried by a single sheet into an assemblage of newspaper sections by means of a stuffing machine having a hopper for receiving a stack of sheet material and having means for offsetting the lowermost item of the stack including a vacuum sucker mounted on an arm and a set of grabbers for engaging and withdrawing the item and depositing same in a carrier, said single sheet being of a stock normally not feedable as an item from said hopper when in single thickness form because of the tendency of the suckers to influence the sheet overlying the sheet which is engaged by the suckers but having a weight, however, sufficient to enable it to be fed in folded form, said method including the steps of A. causing the single sheet to be folded so as to define a generally rectangular panel and a generally rectangular flap, said panel and flap being disposed in overlying relation to each other and interconnected along a fold line at adjacent edges thereof,
  (1) said panel including opposed top and bottom edges having a length no greater than the length of the major fold line of at least one of the folded newspaper sections and including side edges having a length no greater than the length of a lateral edge of at least one of said folded newspaper sections,
    (a) at least one surface of said panel having an advertising message printed thereon,
B. causing a sample of a commercial commodity to be securely attached to one of said panel and flap of said sheet,
C. and placing the folded sheet with sample attached in the hopper so that both the panel and flap are in alignment with each sucker when the sucker engages the sheet so as to insure a double thickness of material at the point of engagement and thereby prevent the vacuum of the suckers from affecting the arrangement of sheets disposed above the sheet engaged by the suckers.

10. An assemblage of printed material in accordance with claim 1 wherein said commercial commodity is an envelope.

11. An assemblage of printed material in accordance with claim 10 wherein said envelope is preformed and includes a flap having a separable portion secured to the insert.

12. An assemblage of printed material in accordance with claim 10 wherein said envelope is in the form of a blank attached to the insert along lines of perforation outlining the sides and flap of the envelope, said blank being detachable from the insert along said lines of perforation and being foldable into an envelope when so detached.

13. An advertising insert in accordance with claim 12 wherein said outlined portion of said panel is provided with an adhesive to retain the portion in envelope form.

14. A single sheet advertising insert for an assemblage of inner and outer newspaper sections, each of said sections being folded along a major fold line and including lateral edges generally normal to said fold line, said sections being arranged within one another in said assemblage with each inner section being nested within the folds of an outer section and with the major fold lines of the sections generally collinear, which insert comprises A. a generally rectangular panel including opposed top and bottom edges having a length no greater than the length of the major fold line of at least one of said folded sections and including side edges having a length no greater than the length of a lateral edge of at least one of said folded sections,
  (1) the surfaces of said panel having advertising messages printed thereon,
B. and a generally rectangular flap attached to said panel along a fold line at the bottom edge of said panel,
  (1) one of said panel and flap including lines of perforation outlining a detachable area suitably printed so as to enable it to be utilized as a pre-addressed postal card,
  (2) said detachable area being adapted to be folded upon itself to conceal a message written on one face thereof, while leaving exposed an address designation on an opposite face,
  (3) said panel and flap being formed of a paper stock sufficiently heavy to render said detachable section acceptable for mailing as a postal card.

References Cited by the Examiner

UNITED STATES PATENTS

| | | | |
|---|---|---|---|
| 1,572,392 | 2/1926 | Koehrman | 283—56 |
| 1,769,607 | 7/1930 | Sweetland | 283—56 |
| 2,169,932 | 8/1939 | Sweet et al. | 270—55 X |
| 2,212,397 | 8/1940 | Gomes et al. | 283—56 X |
| 2,268,600 | 1/1942 | Kleineberg | 270—51 |

EUGENE R. CAPOZIO, *Primary Examiner.*

NELSON M. ELLISON, *Assistant Examiner.*